United States Patent

[11] 3,617,316

| [72] | Inventors | Joji Suzuki<br>Itami;<br>Makoto Kume, Takarazuka, both of Japan |
|---|---|---|
| [21] | Appl. No. | 60,105 |
| [22] | Filed | July 31, 1970 |
| [45] | Patented | Nov. 2, 1971 |
| [73] | Assignee | Nippon Sheet Glass Co., Ltd.<br>Osaka, Japan |
| [32] | Priority | Jan. 13, 1966 |
| [33] | | Japan |
| [31] | | 41/1557 |
| | | Continuation-in-part of application Ser. No. 606,530, Jan. 3, 1967, now Patent No. 3,548,060. |

[54] PHOTOTROPIC GLASS
2 Claims, No Drawings

[52] U.S. Cl. ................................................ 106/47,
106/52, 106/DIG. 6, 106/53

[51] Int. Cl. .................................................. C03c 3/26,
C03c 3/14
[50] Field of Search ..................................... 106/47, 52,
53

[56] References Cited
UNITED STATES PATENTS
3,548,060   12/1970   Suzuki et al. ................   106/4.7

Primary Examiner—Helen M. McCarthy
Attorneys—Wenderoth, Lind & Ponach, E. F. Wenderoth, John E. Lind, Vincent M. Creedon and John T. Miller ABSTRACT: A phototropic glass comprising a borate glass body containing therein mycrocrystals of silver chloride or silver bromide, and copper oxide, and method of producing the phototropic glass which comprises melting a bath for the said glass body, forming and cooling the molten glass, heat treating said glass to cause the silver halide to crystallize, and cooling the glass.

PHOTOTROPIC GLASS

This application is a continuation-in-part application of Ser. No. 606,530 filed Jan. 3, 1967, now U.S. Pat. No. 3,548,060.

This invention relates to a new phototropic glass and in particular to a transparent phototropic glass and in particular to a transparent phototropic glass which is promptly darkened by exposure to ultraviolet or visible radiation of short wavelength but is promptly returned to its former state upon termination of the exposure.

Phototropic glasses are characterized in that their optical transmittance varies reversibly with the intensity of actinic radiation incident thereon. Such glasses have a wide variety of applications. When used for ophthalmic lenses or glass for building and automotive purposes, it is required that it be one which not only is prompt in its coloring and decoloring action but is also transparent. When a glass of this type is used for eyeglasses, the glass darkens promptly upon exposure to intense light and protects the dyes, and upon decrease of the light intensity is promptly decolored to permit visibility equal to that of the naked eye. It is also very convenient in the case of windowpanes, since the glass colors or decolors by promptly responding to the changes in intensity of sunlight incident thereon.

It has been known that phototropic glass can be obtained by incorporating a small amount of silver halides in the glass body in their microcrystalline form. The most typical is that disclosed in U.S. Pat. No. 3,208,860, and British Patent Specification No. 950,906, but this requires a certain length of time for the coloration and decoloration of the glass.

An object of this invention is to provide a phototropic glass which is transparent and moreover in which the coloration and decoloration of the glass takes place promptly. Another object is to provide a method of manufacturing such a phototropic glass.

A phototropic glass of this invention comprises a borate glass body containing therein microcrystals of at least one silver halide selected from the group consisting of silver chloride and silver bromide, and copper oxide, said borate glass body consisting essentially of 30–80 percent by weight of $B_2O_3$, 2–35 percent by weight of $Al_2O_3$, 12–45 percent by weight of at least one alkaline earth metal oxide selected from the group consisting of CaO, SrO and BaO, 0–7 percent by weight of at least one oxide selected from PbO and ZnO, 0–2 percent by weight of at least one alkali oxide selected from $Li_2O$, $Na_2O$ and $K_2O$, and 1–5 percent by weight of $SiO_2$, each weight percentage being on an analyzed basis, the concentration of said silver halide being at least 0.05 percent by weight, calculated as silver, of said borate glass body, and the concentration of said copper oxide, as computed as CuO, being at least 0.005 percent by weight of said borate glass body.

The aforesaid phototropic glass according to this invention possesses many properties which are desirably possessed by such a glass. The following are some of its important features:

a. The reversibility of coloration and recovery of the invention phototropic glass to actinic radiation is prompt. That is to say, the invention phototropic glass, which uses borate glass as its body, requires about 20–60 seconds for the saturation of coloring of the glass and about 5–30 seconds for recovering its optical density to half of the saturation value, both times being very prompt.

b. The invention phototropic glass is completely colorless or, at most, tinged with a very light yellow color which is almost colorless. This glass moreover is very transparent.

c. The phototropic glass of this invention is comparatively chemically table. Prior to this invention, we made a phototropic glass comprising a $B_2O_3$-$Li_2O$ glass body containing microcrystals of AgBr, but this glass, while prompt in its reversibility of coloration and recovery, was not satisfactory as regards its transparency and chemical durability.

The demonstration of these excellent properties is believed to be due to a synergistic action of the several constituents of the invention phototropic glass. A description of each of the constituents and the amounts thereof in which they are to be contained will be set forth below.

The promptitude of the reversibility of coloration and recovery of the phototropic glass of this invention is achieved by using the prescribed borate glass as the body. The proportions in which the components $B_2O_3$, $Al_2O_3$ and alkaline earth metal oxide are contained must be held within the hereinbefore prescribed ranges. If departures are made from these ranges, there is a tendency to devitrification which makes it impossible to form a transparent glass. The scope of most preferable amounts is 60–80 wt. % of $B_2O_3$, 7–20 wt. % of $Al_2O_3$ and 12–25 wt. percent of an alkaline earth metal oxide. As the alkaline earth metal oxide, CaO, SrO and BaO can be used either singly or in a combination of two or more thereof.

The microcrystals of the silver halide and the copper oxide constituents are mainly responsible for the phototropic property. The photosensitivity is not manifested if the silver halide alone is used, the photosensitiveity being only imparted upon the copresence of a minute quantity of the copper oxide. As the silver halide, AgCl and AgBr are used, which may be used either singly or conjointly. AgI is not used however, because it is far inferior as to its decoloring property, though it has photosensitivity. The amount present of the silver halide must be at least 0.05 wt. %, calculated as silver. If less than this value, the dark density attainable is too small for it to be serviceable. The dark density attained increases nearly proportionally as the amount present of the silver halide increases up to about 1.7 wt. %, calculated as silver, but if it exceeds 1.7 wt. %, the dark density becomes almost constant. Hence, the presence of the silver in an amount exceeding about 1.7 wt. % is not economical. The copper oxide effectively functions with a minute quantity of such as 0.005 wt. % or more, computed as CuO. No especial advantage is had in using it in excess of 0.03 wt. %, since the results are no different.

Addition of small amounts of $SiO_2$ causes an increase in the durability of glass and contributes to the formation of stable glass. However, amounts below 1% are hardly effective, and with amounts above 5%, the resulting phototropic glass has a reduced rate of coloring and decoloring.

The phototropic glass of this invention may contain PbO, ZnO or a mixture of these in amounts not in excess of 7%. Amounts in excess of 7% result in the deterioration of the intended phototropic glass. Furthermore, the phototropic glass of the present invention may contain $Li_2O$, $Na_2O$, $K_2O$ either alone or in admixture in a combined amount not in excess of 2%, and the inclusion of these compounds does not involve deterioration of the properties of the intended phototropic glass. These alkali oxides, as will be described below, can be included in the glass by using a silver salt and an alkali halide as materials for forming a silver halide.

The method of producing a phototropic glass comprises the steps of melting a batch for a borate glass body consisting essentially of 30–86 percent by weight of $B_2O_3$, 2–35 percent by weight of $Al_2O_3$, 12–45 percent by weight of at least one alkaline earth metal oxide selected from the group consisting of CaO, SrO and BaO, 0–7 percent by weight of at least one oxide selected from PbO and ZnO, 0–2 percent by weight of at least one alkali oxide selected from $Li_2O$, $Na_2O$ and $K_2O$, and 1–5 percent by weight of $SiO_2$, each weight percentage being on an analyzed basis, the concentration of said silver halide at least 0.05 percent by weight, calculated as silver, of said borate glass body, and the concentration of said copper oxide, as computed as CuO, being at least 0.005 percent by weight of said borate glass body, forming and cooling the molten glass, followed by heat treating said glass at a temperature of 550–750°C. for a time sufficient to cause said silver halide to crystallize and thereafter cooling the glass.

In the hereinabove described method of producing the phototropic glass of this invention, the starting materials necessary for preparing the batch for the glass body do not differ at all from those which are used in making the conventional borate glass. For example, boric acid, aluminum hydroxide and alkaline earth metal carbonates can be used, which are converted to their respective oxides in the melting step. On the other hand, as regards the silver bromide or chloride, it is possible to use together, for example, a silver salt such as silver nitrate and an alkali halide such as sodium or potassium bromide or chloride as the starting materials, and to form the silver bromide or chloride as a result of the reaction of the silver salt and the alkali halide in the melting step. During the melting process of glass, because loss of an alkali halide is larger than that of a silver salt by volatilization, it is recommended to use the alkali halide in an amount in excess of its equivalent. The melting conditions are also those customarily used, the melting being carried out by heating the starting materials for a period of ½ to 1 hour at a temperature of 1,100° to 1,350° C. in an air or oxidizing atmosphere. Temperature or times above or below these limits are undesirable, since in the case they are below the lower limits, bubbles tend to remain in the resulting molten glass, whereas in the case they are at above the upper limits the amount volatilized of the boric oxide and the halogen components becomes great.

The molten glass obtained in this manner is formed into a suitable shape and cooled. The so obtained glass must be then heated treated at 550°–750° C. A part of the silver halide contained in the glass is formed into very minute crystals by this heat treatment, in consequence of which the glass is imparted photosensitivity. At below 500° C. the photosensitivity is not induced, while at above 750° C. the transparency of the glass is impaired. The period of time suitable for the heat treatment is from ½ to 3 hours. Upon cooling the glass after its heat treatment, the invention phototropic glass having various excellent properties is provided.

The following nonlimitation examples are given to illustrate the method of producing the phototropic glass of this invention and to explain its property of reversibility responding to light.

Example 1

A glass batch comprising 56.0% of $B_2O_3$, 17.6% of $Al_2O_3$, 21.0% of BaO, 1.5% of ZnO, 3.5% of $SiO_2$, 0.1% of $Na_2O$, and 0.3% of $K_2O$ on a weight basis, and 0.6% of Ag, 0.15% of Cl, 0.6% of Br and 0.013% of CuO based on the total weight of the first seven components was melted in a crucible in an atmosphere of air. The molten glass was poured onto a stainless steel plate, shaped in a plate form, and allowed to solidify. The plate glass was heat treated for 30 minutes at 650° C., and then cooled. The glass so obtained was transparent and practically colorless under exclusion of light. This glass was submitted to a light exposure test with the results shown in table I, below, under glass 1. In table I are set forth the results obtained with the glass produced in each example, the values shown being the determinations made as to the state of coloration and decoloration of the respective glasses at the elapsed times indicated after starting the exposure and after termination of the exposure when exposed to light from a xenon lamp for 30 seconds. The values in the table were obtained in the following manner. Each of the glass specimens was measured for its transmittance before and after the exposure. The optical density was computed from the transmittance, and the difference in the optical densities before and after the exposure was obtained. Letting 100 be the optical density at the time of the maximum coloration, the optical densities at the aforesaid elapsed times were expressed as percentages of the optical density at the time of maximum coloration. It can be seen from these results that the phototropic glass of this invention possesses in all instances a very prompt reversibility as to coloration and recovery.

Example 2

Each of the glass batches Nos. 2 to 5 having the formulations indicated in table II was melted in the same way as set forth in example 1, and then shaped in a plate form. Glass no. 5 is a control example in which PbO was contained in excess. Each of the glasses was treated at the treating temperature and for the treating time shown in table II. The glasses obtained were all transparent and practically colorless. These glasses were subjected to the light exposure test in the same manner as in example 1. The results obtained are given in table I. Except glass no. 5, all of the glasses exhibited a fast rate of coloration after the start of light exposure and a fast rate of decoloration after the termination of light exposure. This shows that these glasses are good phototropic glass.

TABLE I

[The state of coloration and decoloration of the respective glasses at the elapsed times indicates after starting the exposure and after termination of the exposure]

| Specimen | Time elapsed after start of exposure (sec.) | | | | | | Time elapsed after termination of exposure (sec.) | | | | |
|---|---|---|---|---|---|---|---|---|---|---|---|
| | 0 | 5 | 10 | 20 | 30 | 60 | 5 | 10 | 20 | 30 | 60 |
| Glass: | | | | | | | | | | | |
| 1 | 0 | 40 | 65 | 85 | 94 | 100 | 75 | 63 | 49 | 40 | 25 |
| 2 | 0 | 45 | 70 | 90 | 100 | 100 | 73 | 59 | 46 | 35 | 20 |
| 3 | 0 | 44 | 70 | 90 | 97 | 100 | 82 | 66 | 50 | 42 | 24 |
| 4 | 0 | 35 | 65 | 88 | 97 | 100 | 74 | 60 | 47 | 36 | 21 |
| 5* | 0 | 33 | 54 | 70 | 82 | 97 | 92 | 84 | 73 | 63 | 48 |

*Glass 5: Control.

TABLE II

| Glass Number | 2 | 3 | 4 | 5* |
|---|---|---|---|---|
| Formulation (wt. percent): | | | | |
| $B_2O_3$ | 59.4 | 58.6 | 60.1 | 52.0 |
| $Al_2O_3$ | 18.7 | 17.8 | 17.0 | 16.3 |
| CaO | | | 1.8 | 1.3 |
| BaO | 19.8 | 20.4 | 18.0 | 13.9 |
| PbO | | 1.2 | 0.7 | 12.8 |
| ZnO | 0.4 | 0.5 | 0.5 | |
| $SiO_2$ | 1.3 | 1.1 | 1.5 | 3.0 |
| $Li_2O$ | | | | 0.3 |
| $Na_2O$ | 0.1 | 0.1 | 0.1 | 0.1 |
| $K_2O$ | 0.3 | 0.3 | 0.3 | 0.3 |
| Treating temperature (° C.) | 650 | 650 | 625 | 600 |
| Treating time (minutes) | 30 | 30 | 30 | 30 |

* Control.

NOTE.—Each of the above glasses contained Ag 0.6 %, Cl 0.15 %, Br 0.6 %, CuO 0.013 % based on the weight of said borate glass.

We claim:

1. A phototropic glass comprising a borate glass body containing therein microcrystals of at least one silver halide selected from the group consisting of silver chloride and silver bromide, and copper oxide, said borate glass body consisting essentially of 30–86 percent by weight of $B_2O_3$, 2–35 percent by weight of $Al_2O_3$, 12–45 percent by weight of at least one alkaline earth metal oxide selected from the group consisting of CaO, SrO and BaO, 0–7 percent by weight of at least one oxide selected from PbO and ZnO, 0–2 percent by weight of at least one alkali oxide selected from $Li_2O$, $Na_2O$ and $K_2O$, and 1–5 percent by weight of $SiO_2$, each weight percentage being on an analyzed basis, the concentration of said silver halide being at least 0.05 percent by weight, calculated as silver, of said borate glass body, and the concentration of said copper oxide, as computed as CuO, being at least 0.005 percent by weight of said borate glass body.

2. The method of producing a phototropic glass which comprises the steps of melting a batch for a borate glass body consisting essentially of 30–86 percent by weight of $B_2O_3$, 2–35 percent by weight of $Al_2O_3$, 12–45 percent by weight of at least one alkaline earth metal oxide selected from the group consisting of CaO, SrO and BaO, 0–7 percent by weight of at least one oxide selected from PbO and ZnO, 0–2 percent by weight of at least one alkali oxide selected from $Li_2O$, $Na_2O$ and $K_2O$, and 1–5 percent by weight of $SiO_2$, each weight percentage being on an analyzed basis, the concentration of said silver halide at least 0.05 percent by weight, calculated as silver, of said borate glass body, and the concentration of said copper oxide, as computed as CuO, being at least 0.005 percent by weight of said borate glass body, forming and cooling the molten glass, followed by heat treating said glass at a temperature of 550°–750° C. for a time sufficient to cause said sliver halide to crystallize and thereafter cooling the glass.